ROBERT A. JULIAN
INVENTOR
BY
ATTORNEY

United States Patent Office 3,511,036
Patented May 12, 1970

3,511,036
LAWN RAKING TOOL ATTACHMENT FOR ROTARY BLADE TYPE LAWN MOWERS
Robert A. Julian, 2401 S. 47th St., Omaha, Nebr. 68106
Filed Sept. 6, 1968, Ser. No. 757,940
Int. Cl. A01d 51/00
U.S. Cl. 56—27          5 Claims

ABSTRACT OF THE DISCLOSURE

This invention relates to a lawn raking tool attachment for powered lawn mowers of the type comprising a substantially horizontal plant growth rotary cutting blade that is removably attached to the vertical powered rotatable shaft of the lawn mower. The lawn raking tool of this invention is removably attached to the powered rotatable shaft of the lawn mower in analogous fashion to the removable attachment of the prior art rotary cutting blade, said lawn raking tool attachment comprising an elongate horizontal bar and a plurality of downwardly-extending vertically-adjustable specially constructed prongs spaced at special locations with respect to each other and to the elongate bar.

---

Conventional rotary blade type lawn mowers typically comprise a rollable housing having an open bottom side and a laterally extending opening to which a receptacle is attached to collect the grass cuttings and a vertical powered rotatable shaft to which the horizontal rotary grass cutting blade is removably attached. Centrifugal air streams generated by the whirling rotary cutting blade centrifuge a major portion of the grass cuttings into the receptacle. Nevertheless, a certain minor portion of the grass cuttings fails to be caught by the centrifugal air streams during the grass cutting process and fall to the earth. These minor grass cuttings ever accumulate at the earth surface at grass roots level, and over a period of successive lawn mowings reach such accumulation that lawn growth and development is impaired. In the prior art, removal of the accumulated dead grass cuttings can be accomplished only by the laborious use of manually-operated rakes, or by the use of specially designed expensive powered raking machinery.

It is the general object of the present invention to provide a lawn raking tool attachment for conventional rotary blade type lawn mowers, which may be removably temporarily substituted for the rotary cutting blade component therefor, whereby the owner of a rotary blade type lawn mower might easily remove the accumulated grass cuttings from the lawn utilizing his existing lawn mower equipment.

It is another object of the present invention to provide a lawn raking tool attachment for conventional powered lawn mowers that is exceedingly effective in removing accumulated grass cuttings from the lawn, that is long lasting and reliable in operation, and that requires a minimum of maintenance and repair.

It is another object to provide a single lawn raking tool adaptable for use with many commercial embodiments and styles of powered lawn mowers.

It is a further object to provide a lawn raking tool that is not apt to damage growing turf, nor that itself is apt to be damaged by stones, sticks, and other minor lawn debris.

It is another object to provide a lawn raking tool attachment that is adjustable for various lawn conditions and to compensate for normal wear of the lawn raking tool.

With the above and other objects and advantages in view, which will become more apparent as the description proceeds, the lawn raking tool attachment of the present invention comprises the novel configuration, combination, and arrangement of structural elements, and especially as pointed out in the appended claims, reference being had to the accompanying drawing wherein like characters refer to like parts in the several views, and in which:

Figure 1:
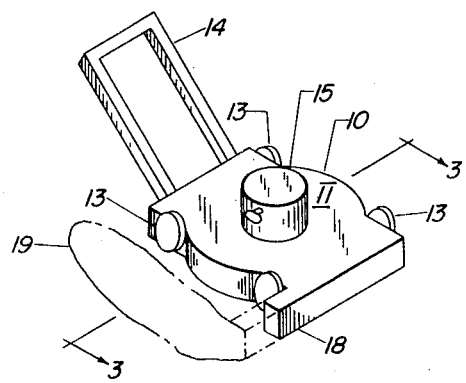
FIG. 1 is a perspective view of a typical representative powered lawn mower for which the lawn raking tool of the present invention is a removable attachment.

The substantially horizontal lawn raking tool T of the present invention is adapted to be removably attached to the powered vertical rotatable shaft 16 of a conventional powered lawn mower which comprises a housing 10 that is provided with a plurality of wheels 13 whereby manual exertion upon a rearwardly-extending handle 14 will cause the housing 10 to rollably traverse a lawn. Mower housing 10 has a substantially fully closed upper side 11 and an open bottom side 12 disposed immediately above and in close proximity to the lowest circumferential periphery of wheels 13. Attached to housing 10 and disposed above housing upper surface 11 is a power means herein as internal combustion engine 15, the powered vertical rotatable shaft 16 of the power means extending downwardly from housing upper side 11, the shaft lower end 17 being disposed between housing sides 11 and 12. A sharp-edged horizontal cutting blade (not shown) is removably attached to powered shaft 16 adjacent lower end 17, and upon the actuation of power means 15 the sharp-edged horizontal blade rotates at a high speed about the vertical axis of powered shaft 16. Thus, the rapidly rotating sharp-edged horizontal blade, not only cuts the lawn plant growth, but also generates a substantial centrifugal air stream forcing the grass cuttings through a lateral opening 18 of lawn mower housing 10 and into a bag-like receptacle 19 (shown in phantom line in FIG. 1).

Lawn raking tool T of the present invention includes an elongate horizontal bar component 20 that generally resembles in plan view the sharp-edged cutting blade of the prior art. Indeed, the lawn raking tool is removably attached to the powered vertical shaft component 16 as a temporary substitute for the sharp-edged cutting blade to provide, not lawn cutting, but lawn raking wherein long accumulated plant cuttings at the earth surface are raked from the earth at the base of the plant growth and then concurrently centrifuged into a suitable receptacle e.g. 19.

Lawn raking tool T comprises a substantially horizontally elongate bar 20 having a pair of elongate horizontal rectangular surfaces including upper surface 21 overlying lower surface 22, a pair of opposed substantially parallel elongate edges 23 and 24, and a pair of opposed substantially parallel ends including a first end 26 and a second end 27. Elongate bar 20 need not be, and preferably does not, function as a cutting blade for plant growth, and accordingly, bar 20 is desirably of uniform rectangular transverse cross-sectional shape along the length thereof including upright non-sharpened elongate edges 23 and 24. Elongate bar 20 has a vertical opening 25 through elongate surfaces 21 and 22 located between ends 26 and 27 at the substantial geometric and gravimetric center of uniform bar 20 whereby said bar 20 consists of two segments 28 and 29 of substantially equal lengths extending in opposite horizontal directions from the bar geometric center 25. Specifically, first bar segment 28 has a finite length F including an inner end at center 25 and an outer end at the bar first end 26, and the said finite length of the bar second segment 29 includes an inner end at center 25 and an outer end at bar second end 27.

Figure 2:
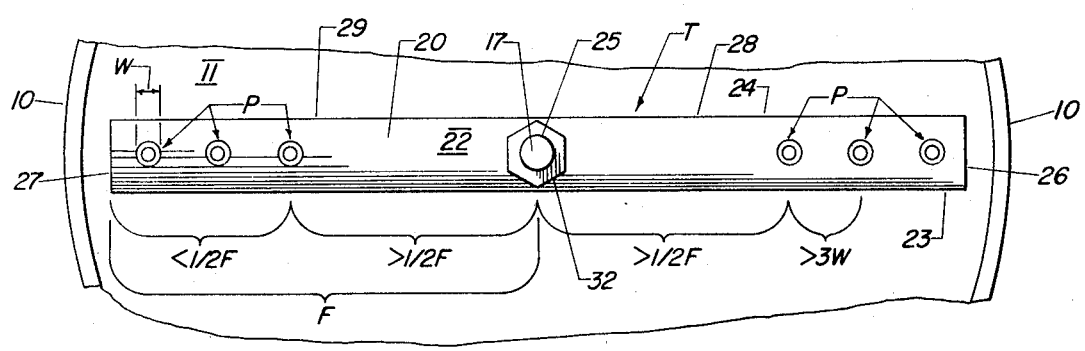
FIG. 2 is a bottom plan view of the typical representative lawn mower of FIG. 1 showing in plan view the full length of the horizontal lawn raking tool attachment of the present invention together with fragments of the lawn mower housing.

Removable attachment of horizontal elongate bar 20 perpendicularly to vertical powered shaft 16 is accomplished in similar fashion as would be the removable attachment of a prior art horizontal sharp-edged rotary plant cutting blade. For example, the threaded lower end 17 of powered shaft 16 is inserted downwardly through vertical opening 25 until upper surface 21 abuts shouldered portion 17A whereupon lockwasher 31 is held in firm abutment against bar lower side 22 with nut 32 threadedly engaged with shaft lower end 17. Other rotary removable attachment means of the prior art would obviously lend themselves to removable attachment of the horizontal bar portion 20 of the present invention. As is evident in FIGS. 2 and 3, in its removably attached position, the elongate surfaces 21 and 22 of bar 20 are disposed between housing sides 11 and 12, the bar ends 26 and 27 being surrounded at all rotational positions about shaft 16 by the upright sides of housing 10.

Figure 3:
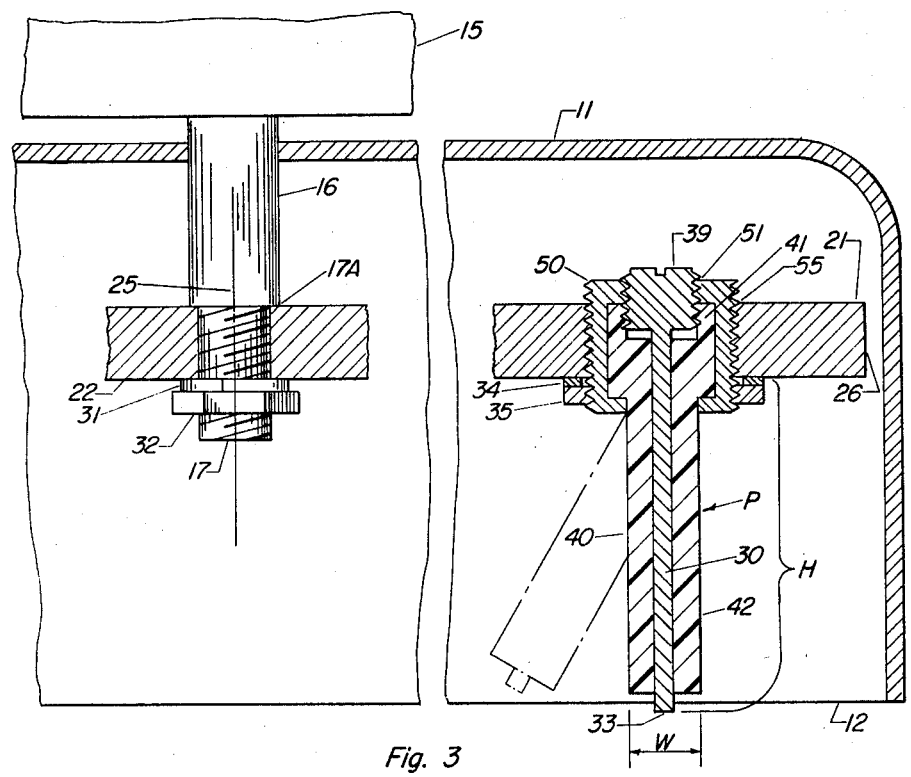
FIG. 3 is a sectional elevational view taken along line 3—3 of FIG. 1.

Removably attached to elongate bar 20 and extending perpendicularly downwardly from elongate lower surface 22 is an even number of vertical raking prongs P, there being an equal number of prongs P on each bar segment. Although the number of prongs P on each bar segment might be only one or two, three prongs on each bar segment lying along a common horizontal line are shown for illustrative purposes in FIG. 2. The effective vertical height H of each prong (the distance between bar lower surface 22 and the prong lowermost extremity e.g. 33, as shown in FIG. 3) is selectively adjustable whereby the lowermost extremities of the plural prongs are adapted to occupy a plurality of common horizontal planes including a plane disposed below housing bottom side 12. Moreover, there are means to maintain the selected vertical height of each prong, said means taking for example the threadedly engaged nut 35 and lock washer 34. Each prong P is resiliently laterally deflectable as indicated in broken line in FIG. 3.

Having now described certain general features of the lawn raking tool T, operation thereof as an attachment for a conventional powered lawn mover will now be described to lay the basis for subsequent discussion of several desirable properties for the prongs P. First of all, the lawn plant growth is freshly cut to a height of approximately H with a prior art horizontal rotary plant growth cutting blade that is removably perpendicularly attached to powered rotatable shaft 16 in conventional fashion. Then the cutting blade is removed from shaft 16 and removable attachment of lawn raking tool T is effected by removably attaching the elongate bar portion 20 to the forward end 17 of powered rotatable shaft 16, similarly to the prior art methods of removably attaching the elongate plant growth cutting blades to powered rotatable shafts, as by means of shouldered portion 17A, a central opening e.g. 25 for shaft threaded end 17, and threaded nut 32. Next, the lawn mower power means e.g. 15, is actuated causing bar 20 to revolve about the vertical axis of powered rotating shaft 16, the lowermost extremities 33 of prongs P being selectively positioned immediately above the earth surface at the accumulated plant cuttings. The centrifugal air stream generated by revolving bar 20 and prongs P, together with the raking or agitation of the accumulated plant cuttings at the earth surface by prongs P adjacent lowermost extremities 33, cause the agitated accumulated cuttings to be centrifuged outwardly of housing opening 18 and into collector receptacle 19.

The rotational speed of the vertical powered shaft 16 of conventional lawn mowers is quite high. Accordingly, it is well recognized in the prior art that the plant growth cutting blade when attached to powered shaft be gravimetrically balanced about its central mounting hole 25 through which shaft 16 is inserted to prevent inimical laterally eccentric vibrational forces upon the powered shaft 16. Similarly, the gravimetric center of lawn raking tool attachment T, including for the elongate bar 20 and the plurality of prongs P, should be at central mounting hole 25 of bar 20. Moreover, the center-of-moment of the raking attachment T, including bar 20 and prongs P, should be at central opening 25 to ensure against inimical laterally eccentric vibrational forces upon powered rotatable shaft 16. In this vane, each of the prongs P is preferably of substantially identical weight, size, and shape, extends downwardly from a single horizontal line, and the prong spacing along each bar segment with respect to each segment's inner end 25 is substantially identical.

An excessive number of prongs P, or too close spacing of the prongs with respect to each other or to bar center 25, will result in excess frictional drag with the turf, which when translated to powered shaft 16, would seriously impair the raking performance of raking tool T. Accordingly, the innermost prong of each segment i.e. that prong located nearest to bar center 25, is preferably disposed at least one-half the finite segment length F outwardly of bar center 25. The maximum prong population on each segment is about three; even a single prong on each segment will result in an efficient lawn raking tool provided it is spaced at least the said distance ½ F outwardly of bar center 25. The horizontal spacing between any consecutive pair of prongs on either bar segment should exceed three times the average horizontal width W below bar 20 of the individual prongs comprising such consecutive pair, herein the width W being the horizontal diameter of substantially cylindrical prongs. Not only would excessively close inter-prongs spacing result in inimical drag upon powered shaft 16, but too closely spaced prongs would be apt to clog with the plant cuttings being raked therewith.

The effective height H of a resiliently laterally deflectable prong P below bar lower surface 22, as compared to its average horizontal width W, bears a ratio of more than three and less than eight. An insufficient degree of lateral deflectability, accompanied by damage to the existing lawn growth, tends to result when the said H/W ratio is less than three. At ratios greater than eight, the prong is apt to lack the compressive strength necessary to sufficiently agitate and rake the accumulated plant cuttings during the lawn raking operation. Definitely preferred for the downwardly-extending effective height H of the several prongs P are resinous materials; in the said uprightly elongate form resinous materials are adapted to repeatedly resiliently laterally deflect without fracture during the lawn raking operation. The prongs are preferably free of transverse structural discontinuities any where along the upright height H so as to provide high tensile strength along the prong upright height. For example, a prong should be non-helical and not vertically elongate more than 10% of its effective height H upon the application of a 6 pound testing load extending downwardly from the lower portions of the prong; excessive elongation i.e. low tensile strength, of a prong would after prolonged raking operations lack the compressive strength necessary to sufficiently agitate and rake the accumulated dead plant cuttings from the earth surface.

As has been previously alluded to, the individual prongs P comprise an upright resinous member extending adjustably vertically downwardly of elongate bar 20. Preferably, however, the lowermost free end of the prong is relatively more rigid and abrasively resistant than is the preponderant prong height whereby the prong is resistant to being worn unduly quickly during the lawn raking operation. For example, the prong P shown in the FIG. 3 detail sectional elevational view includes a substantially cylindrical metallic resiliently laterally deflectable metallic probe 30 slidably disposed along the upright bore of a resiliently laterally deflectable tubular upright resinous member 40. The lowermost free end 33 of probe 30, which is synonymous with the prong lowermost end, extends below the lower end of tubular resinous member 40. During operation of lawn raking tool T, revolving about powered shaft 16, the harder metallic tip 33 receives greater frictional abuse than does tubular resinous member 40. As probe 30 frictionally erodes and becomes progressively shorter in height, tubular resinous member 40 also erodes and becomes progressively shorter in height whereby the probe 30 extends below resinous member 40 to ensure vigorous agitation of accumulated plant cuttings at the earth surface. Eventually, after the prong height has been eroded to the extent that prong lowermost end is disposed substantially above housing bottom end 12, the vertical position of prong P is downwardly adjusted, as by manipulation of metallic cap 50 and nut 35, to maintain prong lowermost end 33 below housing bottom end 12.

Upright tubular resinous member 40 includes a narrower cylindrical lower portion 42 that comprises the major height of tubular member 40 and includes a wider shouldered portion 41 at the upper end thereof. Metallic cap 50, having a threaded upright cylindrical wall, securely surrounds upper shouldered portion 41 of resinous member 40; metallic cap 50 is threadedly engaged with a vertical threaded opening 55 of bar 20, said threaded opening 55 being, of course, horizontally offset with respect to central mounting opening 25. The top end 51 of metallic cap 50 is provided with a vertical threaded perforation, in vertical registry with but of larger diameter than, the upright bore of tubular resinous member 40. Metallic probe 30 includes a threaded head 39 including a transversely slotted upper end, said probe head 39 being threadedly engaged with the vertical perforation of cap 50 whereby the probe lowermost end 33 can be adjusted with respect to tubular member 40 utilizing a conventional screw-driver.

From the foregoing, the construction and operation of the lawn raking tool, will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:

1. A substantially horizontal lawn raking tool adapted to be removably attached to the powered vertical rotatable shaft of a rotary blade type lawn mower that includes a rollable housing having an open bottom side and a substantially closed upper side and that includes a powered vertical rotatable shaft having a lower end extending below the power means and disposed between the upper and bottom sides of the lawn mower housing, said substantially horizontal lawn raking tool being removably attachable to the lawn mower powered vertical shaft nearer to the shaft lower end than to the power means whereby said lawn raking tool is adaptable to rotate in a substantially horizontal plane about the vertical shaft axis, said lawn raking tool comprising: a substantially horizontal relatively-thin elongate bar having an elongate upper surface overlying an elongate lower surface, a pair of opposed elongate edges, a first end, a second end, and a vertical opening through the opposed elongate surfaces and located between the bar first and second ends at the substantial geometric and gravimetric centers of said bar whereby said bar consists of two segments of substantially equal lengths extending in opposite horizontal directions from the bar geometric center, the first bar segment having a finite length defined by an inner end at the bar geometric center and an outer end at the bar first end, the second bar segment also having a said finite length defined by an inner end at the bar geometric center and an outer end at the bar second end; an even number of vertical prongs extending downwardly from the bar elongate lower surface and removably attached to said bar, there being an equal number of vertical prongs disposed on both bar segments with the prong spacing on each segment with respect to the bar geometric center being substantially identical whereby the center-of-moment for the multi-pronged bar subtsantially coincides with the bar geometric center, the innermost prong of each segment being disposed at least one-half the said finite distance outwardly from the segment inner end, the horizontal spacing between any consecutive pair of prongs on either bar segment exceeding at least three times the average horizontal width of the prongs providing any such consecutive pair, the height of said prongs commencing downwardly from the bar being selectively vertically adjustable whereby the lowermost free end of the several prongs are adapted to occupy a plurality of common horizontal planes, the height of any one said prong as compared to the average horizontal width thereof bearing a ratio more than three and less than eight, and the prong along the height being provided of a resiliently deflectable structural material whereby each said prong is repeatedly resiliently horizontally deflectable.

2. The lawn raking tool of claim 1 wherein the lawn raking tool is in removable combination with the powered vertical shaft of a lawn mower; wherein at least one of the common horizontal planes occupiable by the lowermost free end of the several prongs is disposed below the open bottom side of the lawn mower housing; wherein there is a maximum prong population of three on each bar segment; and wherein the at least one prong on each bar segment lie along a common horizontal line.

3. The lawn raking tool of claim 1 wherein at least one of the prongs on each segment is non-helical and comprises an upright resinous member extending adjustably vertically downwardly of the elongate bar and having a relatively more abrasive-resistant lowermost free end, there being means to maintain the vertically adjusted downwardly-extending height of the prong.

4. The lawn raking tool of claim 3 wherein the upright resinous member is of a tubular configuration including a cylindrical stud at the lower end and comprising the major height of the upright resinous member and including a wider shouldered portion at the resinous member upper end, a metallic cap securely surrounding the upper shouldered portion of the upright resinous member, said metallic cap having upright threaded sides threadedly engaged with an offset vertical opening of the bar to provide maintainable vertical adjustability for the prong, said metallic cap being provided with a vertical threaded perforation in registry with the central bore of the tubular upright resinous member, and a relatively rigid cylindrical metallic probe slidably disposed along the central bore of the tubular upright resinous member, the lowermost end of the metallic probe being disposed below the lower end of the upright resinous member, a threaded head attached to the upper end of metallic probe and threadedly engaged with the cap perforation whereby vertical relationship of the metallic probe with respect to the upright resinous member might be varied, the metallic probe having greater abrasive resistance than does the structural material of the upright resinous member.

5. A substantially horizontal lawn raking tool in removably attached combination with the powered vertical rotatable shaft of a rotary blade type lawn mower that includes a rollable housing having an open bottom side and a substantially closed upper side and that includes a powered vertical rotatable shaft having a lower end extending below the power means and disposed between the upper and bottom sides of the lawn mower housing, said substantially horizontal lawn raking tool being adaptable to rotate in a substantially horizontal plane about the vertical shaft axis, said lawn raking tool comprising: a substantially horizontal relatively-thin elongate bar having an elongate upper surface overlying an elongate lower surface, a pair of opposed elongate edges, a first end, a second end, and a vertical opening through the opposed elongate surfaces and located between the bar first and second ends at the substantial geometric and gravimetric centers of said bar whereby said bar consists of two segments of substantially equal lengths extending in opposite horizontal directions from the vertical opening at the bar geometric center, the powered vertical rotatable shaft extending downwardly through the bar central opening; an even number of vertical prongs extending downwardly from the bar elongate lower surface and removably attached to said bar, there being an equal number of vertical prongs disposed on both bar segments with the prong spacing on each segment with respect to the bar geometric center being substantially identical whereby the center-of-moment for the multi-pronged bar substantially coincides with the bar geometric center, the innermost prong of each segment being disposed at least one-half the said finite distance outwardly from the segment inner end, the horizontal spacing between any consecutive pair of prongs on a bar segment exceeding at least three times the average horizontal width of the prongs providing any such consecutive pair, and each prong along the height thereof being provided of a resiliently deflectable structural material whereby each prong is repeatedly resiliently horizontally deflectable.

References Cited

UNITED STATES PATENTS 3,367,093  2/1968  Zwickel _____ 56—27

ROBERT PESHOCK, Primary Examiner